United States Patent
Kanayama et al.

(10) Patent No.: US 7,846,060 B2
(45) Date of Patent: Dec. 7, 2010

(54) VEHICULAR CONTROL DEVICE AND METHOD

(75) Inventors: Takeshi Kanayama, Toyota (JP); Masatoshi Ito, Okazaki (JP); Koji Hayashi, Toyota (JP); Koki Ueno, Toyoto (JP); Tsuyoshi Mikami, Nisshin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 831 days.

(21) Appl. No.: 11/604,705

(22) Filed: Nov. 28, 2006

(65) Prior Publication Data
US 2007/0173370 A1 Jul. 26, 2007

(30) Foreign Application Priority Data
Jan. 24, 2006 (JP) .............................. 2006-015330

(51) Int. Cl.
*B60K 1/02* (2006.01)
(52) U.S. Cl. .......................................... 477/3; 477/159
(58) Field of Classification Search ....................... None
See application file for complete search history.

(56) References Cited

U.S. PATENT DOCUMENTS

| | | | | |
|---|---|---|---|---|
| 6,709,362 B2* | 3/2004 | Tomohiro et al. | ............... | 477/3 |
| 6,769,502 B2* | 8/2004 | Nakamori et al. | ........ | 180/65.25 |
| 6,807,934 B2* | 10/2004 | Kataoka et al. | ........... | 123/179.4 |
| 6,913,558 B2* | 7/2005 | Mori et al. | ...................... | 477/3 |
| 7,056,260 B2* | 6/2006 | Nakamori et al. | ............... | 477/3 |
| 7,137,924 B2* | 11/2006 | Ito et al. | ......................... | 477/3 |
| 7,314,425 B2* | 1/2008 | Ito et al. | ......................... | 477/5 |
| 7,374,510 B2* | 5/2008 | Unno et al. | .................... | 477/44 |
| 7,410,445 B2* | 8/2008 | Surewaard et al. | ............ | 477/22 |
| 7,470,211 B2* | 12/2008 | Ueura et al. | .................... | 477/97 |
| 7,473,205 B2* | 1/2009 | Shimizu et al. | ................. | 477/3 |
| 2004/0152558 A1* | 8/2004 | Takami et al. | .................. | 477/3 |
| 2006/0289236 A1* | 12/2006 | Nishino | ...................... | 184/6.1 |

FOREIGN PATENT DOCUMENTS

| | | |
|---|---|---|
| EP | 1 116 619 A2 | 7/2001 |
| EP | 1 481 832 A2 | 12/2004 |
| JP | A 10-306739 | 11/1998 |
| JP | A 2003-301731 | 10/2003 |
| JP | A 2004-66898 | 3/2004 |
| JP | A 2004-263569 | 9/2004 |
| JP | A 2005-207304 | 8/2005 |
| WO | WO 2005/070717 A1 | 8/2005 |

* cited by examiner

*Primary Examiner*—David D Le
*Assistant Examiner*—Justin Holmes
(74) *Attorney, Agent, or Firm*—Oliff & Berridge, PLC

(57) ABSTRACT

When an engine is in operation an ignition switch is turned off by a driver an ECU executes a program including the step of actuating an electric motor driven oil pump.

18 Claims, 6 Drawing Sheets

VEHICULAR CONTROL DEVICE AND METHOD

This nonprovisional application is based on Japanese Patent Application No. 2006-015330 filed with the Japan Patent Office on Jan. 24, 2006, the entire contents of which are hereby incorporated by reference.

BACKGROUND OF THE INVENTION

1. Field of the Invention

The present invention relates generally to vehicular control devices and methods and particularly to technological art employed to control an electric motor driven oil pump mounted in a vehicle having a mechanical oil pump driven by an engine to generate hydraulic pressure and a transmission hydraulically operated and receiving driving force from a rotating electric machine and transmitting the received driving force to a driving wheel.

2. Description of the Background Art

In recent years, as part of approaches for environmental issues, a hybrid vehicle is gaining attention that utilizes driving force received from a motor or a similar rotating electric machine to assist an engine, run the vehicle, and/or the like. One such hybrid vehicle receives driving force from a rotating electric machine and transmits the received force to a driving wheel via a transmission having a plurality of gears (or gear ratios). This transmission is implemented by that formed for example of a planetary gear. Such a transmission has a friction engagement element hydraulically operated to implement a gear as desired. This requires an oil pump for generating hydraulic pressure provided to the friction engagement element. As has been described above, a hybrid vehicle has a plurality of power sources such as an engine, a motor and the like. As such, it can use not only both of the power sources but also one of them to run. Accordingly, in addition to a mechanical oil pump driven by the engine, also providing an electric motor driven oil pump capable of generating hydraulic pressure even when the engine is stopped is considered as an approach to ensure hydraulic pressure while the engine is stopped.

Japanese Patent Laying-Open No. 2005-207304 discloses a control system provided for a hybrid vehicle having two oil pumps, i.e., a mechanical oil pump and an electric motor driven oil pump to control the oil pump without increased power loss or insufficient hydraulic pressure. The publication describes the control system for a hybrid vehicle in which a second prime mover (a rotating electric machine) is connected to an output member to which a power is transmitted from a first prime mover through a transmission in which a torque capacity is varied in accordance with an oil pressure, and which has a first hydraulic pump (a mechanical oil pump) driven by the first prime mover (an engine) for establishing an oil pressure to be fed to the transmission, and a second hydraulic pump (an electric motor driven oil pump) arranged in parallel with the first hydraulic pump and driven by an electric motor. The control system includes a torque limiting unit limiting an output torque of the second prime mover temporarily at a starting time of the first prime mover.

As the publication describes the control system for a hybrid vehicle, the second prime mover outputs a temporarily limited torque when the first prime mover starts. As such, if the first prime mover is not completely started and accordingly the second hydraulic pump is operated to generate hydraulic pressure, the torque input from the second prime mover to the transmission is limited, and the hydraulic pressure required or requested by the transmission is not particularly increased. Relative shortage of hydraulic pressure can thus be avoided.

When the engine is in operation and for example the driver turns off the ignition switch to stop the engine, the hydraulic pressure generated by the mechanical oil pump decreases. This reduces the torque capacity of the transmission connected to the rotating electric machine and there will not be transmission of torque between the rotating electric machine and the transmission. At the time, in stopping the engine, if the output shaft varies in how it rotates, the transmission connected via a drive shaft to the engine also internally experiences variation, e.g., has a planetary gear varied in how it rotates. This can abruptly close a gap (or a backlash) in the planetary gear. As a result in the transmission gears can collide against each other thus cause noise. This noise discomforts the driver and results in poor drivability. Furthermore when the engine is stopped and the output shaft has a number of revolutions per minute that passes through the engine's resonance frequency band, the output shaft significantly varies in how it rotates, and large vibration can occur. However, Japanese Patent Laying-Open No. 2005-207304 is silent on noise and vibration caused when an engine is stopped.

SUMMARY OF THE INVENTION

The present invention contemplates a vehicular control device and method capable of alleviating or preventing noise and vibration that can be caused when an engine is stopped.

The present invention in one aspect provides a vehicular control device for a vehicle having an engine, a first rotating electric machine connected to an output shaft of the engine, a second rotating electric machine, a transmission hydraulically operated to transmit a torque from the second rotating electric machine to a driving wheel, an electric motor driven oil pump, and a mechanical oil pump driven by the engine. The vehicular control device includes an operation unit. If an ignition switch is operated to stop the engine, the operation unit allows the transmission to receive hydraulic pressure to engage a friction engagement element of the transmission and thus control the transmission to be capable of transmitting a torque from the second rotating electric machine. If the ignition switch is operated to stop the engine, the operation unit controls the second rotating electric machine to generate a torque. If the engine is in operation and the ignition switch is operated to stop the engine, the operation unit controls the electric motor driven oil pump to be actuated.

In accordance with the present invention if for example a driver performs an operation to turn off an ignition switch the first rotating electric machine generates a torque to rotate the output shaft of the engine to stop the engine at a predetermined crank angle. If at the time the output shaft varies in how it rotates, such variation in the rotation is transmitted to the transmission. Accordingly the transmission also experiences variation therein, e.g., a planetary gear varies in how it rotates. This can suddenly close a gap (a backlash) in the planetary gear. Thus in the transmission gears can collide against each other and thus cause noise. Furthermore when the engine is stopped and the output shaft has a number of revolutions per minute that passes through the engine's resonance frequency band, the output shaft significantly varies in how it rotates, and large vibration can occur. Accordingly a gap between gears in an interior of the like of the transmission is closed, and a torque is transmitted to the engine to reduce or prevent variation in the rotation of the output shaft, and to do so, the transmission is fed with hydraulic pressure to engage a friction engagement element thereof to control the transmission to be capable of transmitting a torque from the second rotating electric machine, and in that condition, the second rotating electric machine generates a torque. However, if the output shaft of the engine rotates at a reduced number of revolutions per minute, the mechanical oil pump generates reduced hydraulic pressure. With the reduced hydraulic pressure, the transmission, connected to the second rotating electric machine, is reduced in torque capacity and there will not be transmission of torque between the second rotating electric machine and the transmission. Accordingly when the engine is in operation and the ignition switch is operated the electric motor driven oil pump is actuated. The electric motor driven oil pump can generate hydraulic pressure to prevent the transmission from receiving such reduced hydraulic pressure. Thus the torque generated by the second rotating electric machine can close the gap between the gears in the transmission and thus hold the gears and the engine can also receive torque continuously. As a result a vehicular control device can be provided that can alleviate or prevent the collision of gears in the transmission and the noise that can be caused in stopping engine, and also reduce variation in the location of the output shaft to alleviate or prevent vibration.

Preferably the operation unit determines whether hydraulic pressure generated by the mechanical oil pump before that the ignition switch is operated is detected, can be maintained, and if the hydraulic pressure generated by the mechanical oil pump can be maintained the operation unit prohibits activating the electric motor driven oil pump.

In accordance with the present invention if the hydraulic pressure generated by the mechanical oil pump before that the ignition switch is operated is detected can be maintained the operation unit prohibits activating the electric motor driven oil pump. This can prevent the electric motor driven oil pump from being actuated despite that the transmission receives sufficient hydraulic pressure. This can contribute to reduced power consumption and hence alleviate or prevent poor fuel economy.

Still preferably, the operation unit determines from temperature of hydraulic fluid whether the hydraulic pressure generated by the mechanical oil pump can be maintained.

In accordance with the present invention if the hydraulic fluid is high in temperature it is decreased in viscosity and equipment (a hydraulic circuit or the like) adjusting hydraulic pressure tends to have an increased amount of the hydraulic fluid leaking therefrom. This tends to provide reduced hydraulic pressure. In contrast, if the hydraulic fluid is low in temperature it is increased in viscosity and the equipment does not have a large amount of the hydraulic fluid leaking therefrom, and the hydraulic pressure hardly decreases. Accordingly, whether the hydraulic pressure generated by the mechanical oil pump can be maintained is determined from the temperature of the hydraulic fluid. Thus the condition of the hydraulic pressure fed to the transmission can be determined with high precision.

Still preferably if the ignition switch is operated by a driver to stop the engine, the operation unit controls the first rotating electric machine to generate a torque to rotate the output shaft of the engine to stop the engine at a predetermined crank angle.

In accordance with the present invention when the driver performs an operation for example to turn off the ignition switch the first rotating electric machine can generate a torque to rotate the output shaft of the engine to stop the engine at the predetermined crank angle.

Still preferably, the operation unit controls the first rotating electric machine such that the first rotating electric machine maintains a predetermined torque to allow the engine to have a predetermined number of revolutions for a predetermined period of time, and in that condition, the output shaft of the engine is rotated to attain the predetermined crank angle, and thereafter the torque is reduced to stop the engine at the predetermined crank angle. After the electric motor driven oil pump is actuated, the electric motor driven oil pump is stopped as based on a torque of the first rotating electric machine.

In accordance with the present invention the first rotating electric machine maintains a predetermined torque to allow the engine to have a predetermined number of revolutions for a predetermined period of time, and in that condition, the output shaft of the engine is rotated to attain the predetermined crank angle, and thereafter the torque is reduced. Note that in stopping the engine with its number of revolutions for the predetermined period of time equal to the predetermined number of revolutions for the predetermined period of time a period of time elapsing before the engine attains the predetermined crank angle varies with how the engine is operated, whereas a period of time elapsing after decreasing the torque is started and before the torque attains "0" is substantially constant regardless of how the engine is operated. Accordingly, stopping the electric motor driven oil pump when a predetermined period of time has elapsed since the torque of the first rotating electric machine started to decrease, allows the electric motor driven oil pump to be operated for a minimal required period of time. Thus after control means actuates the electric motor driven oil pump the electric motor driven oil pump is stopped as based on the torque of the first rotating electric machine. Thus, in stopping the engine, insufficient hydraulic pressure can be alleviated or prevented and the electric motor driven oil pump can also be operated for the minimal required period of time.

The present invention in another aspect provides a method of controlling a vehicle having an engine, a first rotating electric machine connected to an output shaft of the engine, a second rotating electric machine, a transmission hydraulically operated to transmit a torque from the second rotating electric machine to a driving wheel, an electric motor driven oil pump, and a mechanical oil pump driven by the engine. The present method includes the steps of: in response to an ignition switch being operated to stop the engine, feeding the transmission with hydraulic pressure to engage a friction engagement element of the transmission to control the transmission to be capable of transmitting a torque from the second rotating electric machine; in response to the ignition switch being operated to stop the engine, controlling the second rotating electric machine to generate a torque; and if the engine is in operation and the ignition switch is operated to stop the engine, controlling the electric motor driven oil pump to be actuated.

In accordance with the present invention if for example a driver performs an operation for example to turn off an ignition switch the first rotating electric machine generates a torque to rotate the output shaft of the engine to stop the engine at a predetermined crank angle. If at the time the output shaft varies in how it rotates, such variation in the rotation is transmitted to the transmission. Accordingly the transmission also experiences variation therein, e.g., a planetary gear varies in how it rotates. This can suddenly close a gap (a backlash) in the planetary gear. Thus in the transmission gears can collide against each other and thus cause noise. Furthermore when the engine is stopped and the output shaft has a number of revolutions per minute that passes through the engine's resonance frequency band, the output shaft significantly varies in how it rotates, and large vibration can occur. Accordingly a gap between gears in an interior of the like of the transmission is closed, and a torque is transmitted to the engine to reduce or prevent variation in the rotation of the output shaft, and to do so, the transmission is fed with hydraulic pressure to engage a friction engagement element thereof to control the transmission to be capable of transmitting a torque from the second rotating electric machine, and in that condition, the second rotating electric machine generates a torque. However, if the output shaft of the engine rotates at a reduced number of revolutions per minute, the mechanical oil pump generates reduced hydraulic pressure. With the reduced hydraulic pressure, the transmission, connected to the second rotating electric machine, is reduced in torque capacity and there will not be transmission of torque between the second rotating electric machine and the transmission. Accordingly when the engine is in operation and the ignition switch is operated the electric motor driven oil pump is actuated. The electric motor driven oil pump can generate hydraulic pressure to prevent the transmission from receiving such reduced hydraulic pressure. Thus the torque generated by the second rotating electric machine can close the gap between the gears in the transmission and thus hold the gears and the engine can also receive torque continuously. As a result a vehicular control method can be provided that can alleviate or prevent the collision of gears in the transmission and the noise that can be caused in stopping engine, and also reduce variation in the location of the output shaft to alleviate or prevent vibration.

Preferably the present method further includes the steps of: determining whether hydraulic pressure generated by the mechanical oil pump before that the ignition switch is operated is detected, can be maintained, and if the hydraulic pressure generated by the mechanical oil pump can be maintained, then prohibiting actuating the electric motor driven oil pump in the step of controlling the pump.

In accordance with the present invention if the hydraulic pressure generated by the mechanical oil pump before that the ignition switch is operated is detected can be maintained the operation unit prohibits activating the electric motor driven oil pump. This can prevent the electric motor driven oil pump from being actuated despite that the transmission receives sufficient hydraulic pressure. This can contribute to reduced power consumption and hence alleviate or prevent poor fuel economy.

Still preferably, the step of determining whether the hydraulic pressure can be maintained includes the step of determining from temperature of hydraulic fluid whether the hydraulic pressure generated by the mechanical oil pump can be maintained.

In accordance with the present invention if the hydraulic fluid is high in temperature it is decreased in viscosity and equipment (a hydraulic circuit or the like) adjusting hydraulic pressure tends to have an increased amount of the hydraulic fluid leaking therefrom. This tends to provide reduced hydraulic pressure. In contrast, if the hydraulic fluid is low in temperature it is increased in viscosity and the amount of the hydraulic fluid leaking from the equipment is small, and the hydraulic pressure hardly decreases. Accordingly, whether the hydraulic pressure generated by the mechanical oil pump can be maintained is determined from the temperature of the hydraulic fluid. Thus the condition of the hydraulic pressure fed to the transmission can be determined with high precision.

Still preferably the present method further includes the step of controlling the first rotating electric machine to stop the engine at a predetermined crank angle by rotating the output shaft of the engine by causing the first rotating electric machine to generate a torque when the ignition switch is operated by a driver to stop the engine.

In accordance with the present invention when the driver performs an operation for example to turn off the ignition switch the first rotating electric machine can generate a torque to rotate the output shaft of the engine to stop the engine at the predetermined crank angle.

Still preferably, the step of controlling the first rotating electric machine to stop the engine includes the step of controlling the first rotating electric machine such that the first rotating electric machine maintains a predetermined torque to allow the engine to have a predetermined number of revolutions for a predetermined period of time, and in that condition, the output shaft of the engine is rotated to attain the predetermined crank angle, and thereafter the torque is reduced to stop the engine at the predetermined crank angle. The present method further includes the step of stopping the electric motor driven oil pump, as based on a torque of the first rotating electric machine, after the electric motor driven oil pump is actuated.

In accordance with the present invention the first rotating electric machine maintains a predetermined torque to allow the engine to have a predetermined number of revolutions for a predetermined period of time, and in that condition, the output shaft of the engine is rotated to attain the predetermined crank angle, and thereafter the torque is reduced. Note that in stopping the engine with its number of revolutions for the predetermined period of time equal to the predetermined number of revolutions for the predetermined period of time a period of time elapsing before the engine attains the predetermined crank angle varies with how the engine is operated, whereas a period of time elapsing after decreasing the torque is started and before the torque attains "0" is substantially constant regardless of how the engine is operated. Accordingly, stopping the electric motor driven oil pump when a predetermined period of time has elapsed since the torque of the first rotating electric machine started to decrease, allows the electric motor driven oil pump to be operated for a minimal required period of time. Thus after control means actuates the electric motor driven oil pump the electric motor driven oil pump is stopped as based on the torque of the first rotating electric machine. Thus, in stopping the engine, insufficient hydraulic pressure can be alleviated or prevented and the electric motor driven oil pump can also be operated for the minimal required period of time.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter reference will be made to the drawings to describe an embodiment of the present invention. In the following description, identical components are identically denoted. Their names and functions are also identical. Accordingly, they will not be described repeatedly in detail.

Figure 1:
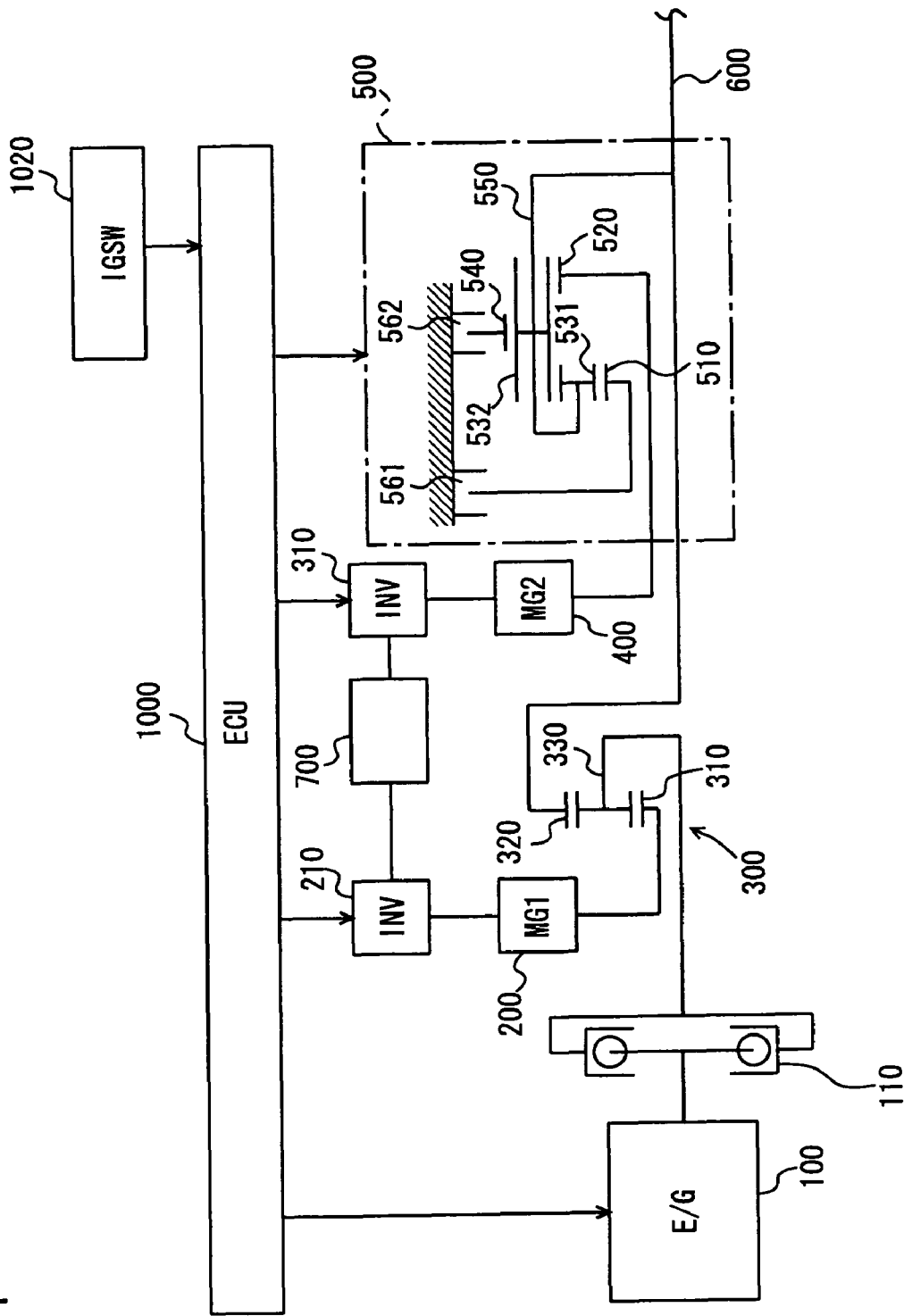
FIG. 1 schematically shows a configuration of a power train of a hybrid vehicle.

With reference to FIG. 1, the present embodiment provides a control device mounted in a hybrid vehicle having a power train as will be described hereinafter. Note that the control device of the present embodiment is implemented for example by a program executed by an electronic control unit (ECU). As shown in FIG. 1, the power train is configured mainly of an engine 100, a motor generator (MG) (1) 200, a power split device 300 adding or splitting a torque between engine 100 and MG (1) 200, an MG (2) 400, and a transmission 500.

Engine 100 is a gasoline engine, a diesel engine or a similar known power device combusting fuel to output power and is configured to allow a throttle angle (an amount of intake air), an amount of fuel supplied, a timing of ignition, and other operation states to be electrically controlled. It is controlled for example by an ECU 1000 having a microcomputer serving as a main component.

MG (1) 200 is by way of example a 3-phase alternate current rotating electric machine and configured to provide a function serving as a motor and that serving as a power generator. It is connected via an inverter 210 to a battery or a similar electricity storage device 700. Inverter 210 can be controlled to set a torque output from MG (1) 200 or a regenerative torque thereof, as appropriate. It is controlled by ECU 1000. Note that MG (1) 200 has a stator (not shown) fixed and thus prevented from rotation.

Power split device 300 is a known gear mechanism causing a differential action such that an externally toothed sungear (S) 310, an internally toothed ring gear (R) 320 arranged concentrically with respect to sungear (S) 310, and a carrier (C) 330 holding a pinion gear, which meshes with sungear (S) 310 and ring gear (R) 320, to rotate and revolve as desired serve as three rotative elements. Engine 100 has an output shaft connected via a damper 110 to a first rotative element, i.e., carrier (C) 330. In other words, carrier (C) 330 acts as an input element.

In contrast, to a second rotative element, i.e., sungear (S) 310, is connected a motor (not shown) of MG (1) 200. Thus sungear (S) 310 serves as a so-called reaction element and a third rotative element, i.e., ring gear (R) 320, serves as an output element, and ring gear (R) 320 is connected to an output shaft 600 connected to a driving wheel (not shown).

Figure 2:
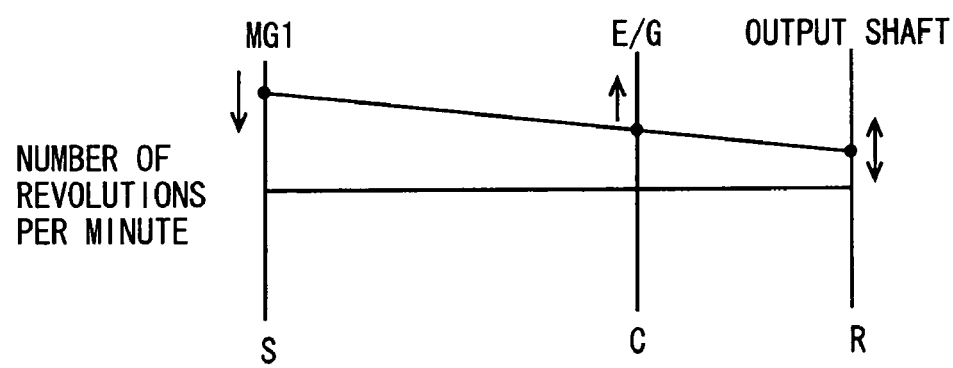
FIG. 2 is a nomographic chart of a power split device.

FIG. 2 is a nomographic chart of power split device 300. As shown in FIG. 2, for a torque output from engine 100 and received by carrier (C) 330, a reactive torque provided by MG (1) 200 is input to sungear (S) 310. These torques are added/subtracted, and a torque of a magnitude thus obtained appears at ring gear (R) 320 serving as the output element. In that case, MG (1) 200 has its rotor rotated by that torque, and MG (1) 200 functions as a power generator. Furthermore, if ring gear (R) 320 has a fixed number of revolutions per minute, changing that of revolutions per minute of MG (1) 200 to be large or small allows engine 100 to have a number of revolutions per minute varying continuously (or steplessly). More specifically, MG (1) 200 can be controlled to control engine 100 to achieve a number of revolutions per minute for example allowing the best fuel economy. It is controlled by ECU 1000.

If the vehicle is running and engine 100 is stopped, MG (1) 200 rotates backward, and if in that condition MG (1) 200 is controlled to function as a motor and output a torque in the direction of forward rotation, a torque having a direction allowing engine 100 connected to carrier (C) 330 to rotate forward acts on engine 100, and engine 100 can be started (or motored or cranked) by MG (1) 200. In that case, a torque having a direction to stop output shaft 600 from rotating acts on the output shaft. Thus a drive torque for running can be maintained by controlling a torque output from MG (2) 400 and simultaneously engine 100 can be started smoothly. Note that this type of hybrid system is referred to as a mechanical distribution type or a split type.

With reference again to FIG. 1, MG (2) 400 is by way of example a 3-phase alternate current rotating electric machine and configured to provide a function serving as a motor and that serving as a power generator. It is connected via an inverter 310 to the battery or the similar electricity storage device 700. Inverter 310 can be controlled to control the drive and regenerative states of MG (2) 400 and the torque thereof in each state. Note that MG (2) 400 has a stator (not shown) fixed and thus prevented from rotating.

Transmission 500 is configured of a set of a Ravignaux type of planetary gear mechanisms provided with externally toothed, first and second sungears (S1) 510 and (S) 520, with the first sungear (S1) 510 meshing with a first pinion 531 meshing with a second pinion 532 meshing with a ring gear (R) 540 which and sungears 510 and 520 are arranged concentrically.

Note that each pinion 531, 532 is held by a carrier (C) 550 to be rotated and revolved as desired. Furthermore the second sungear (S2) 520 meshes with the second pinion 532. Thus the first sungear (S1) 510 and ring gear (R) 540 together with pinions 531 and 532 configure a mechanism corresponding to a double-pinion planetary gear mechanism, and the second sungear (S2) 520 and ring gear (R) 540 together with the second pinion 532 configure a mechanism corresponding to a single-pinion planetary gear mechanism.

Furthermore transmission 500 is provided with a B1 brake 561 selectively fixing the first sungear (S1) 510 and a B2 brake 562 selectively fixing ring gear (R) 540. Brakes 561 and 562 are a so-called friction engagement element generating force for engagement by frictional force and can be implemented by an engagement device employing multiple plates or that employing a band. Brakes 561 and 562 are configured to have their respective torque capacities continuously varying with force depending on hydraulic pressure for engagement. Furthermore, to the second sungear (S2) 520, MG (2) 400 is connected. Carrier (C) 550 is connected to output shaft 600.

Thus transmission 500 has the second sungear (S2) 520 serving as a so-called input element and carrier (C) 550 serving as an output element, and B1 brake 562 can be engaged to set a high gear having a gear ratio larger than "1". Disengaging B1 brake 561 and engaging B2 brake 562 sets a low gear having a gear ratio larger than the high gear.

The gears are shifted as based on vehicular speed, driving force required (or accelerator pedal position) and/or a similar running condition. More specifically, a gear range is previously determined in the form of a map (a shift map) and one of the gears is set as controlled in accordance with a driving state detected.

Figure 3:
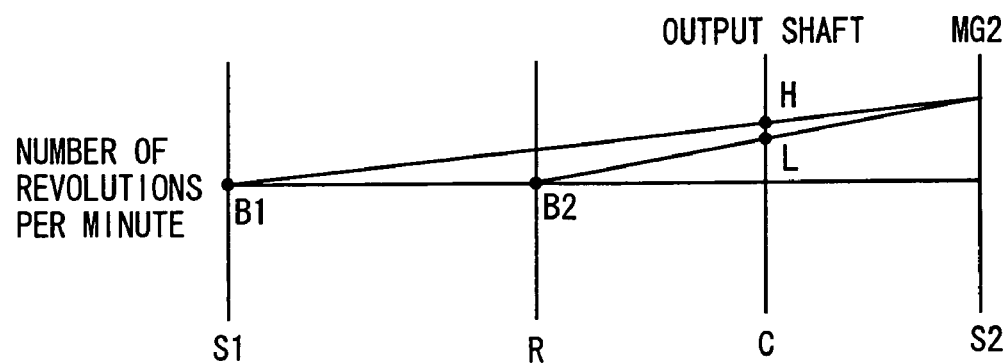
FIG. 3 is a nomographic chart of a transmission.
Figure 4:
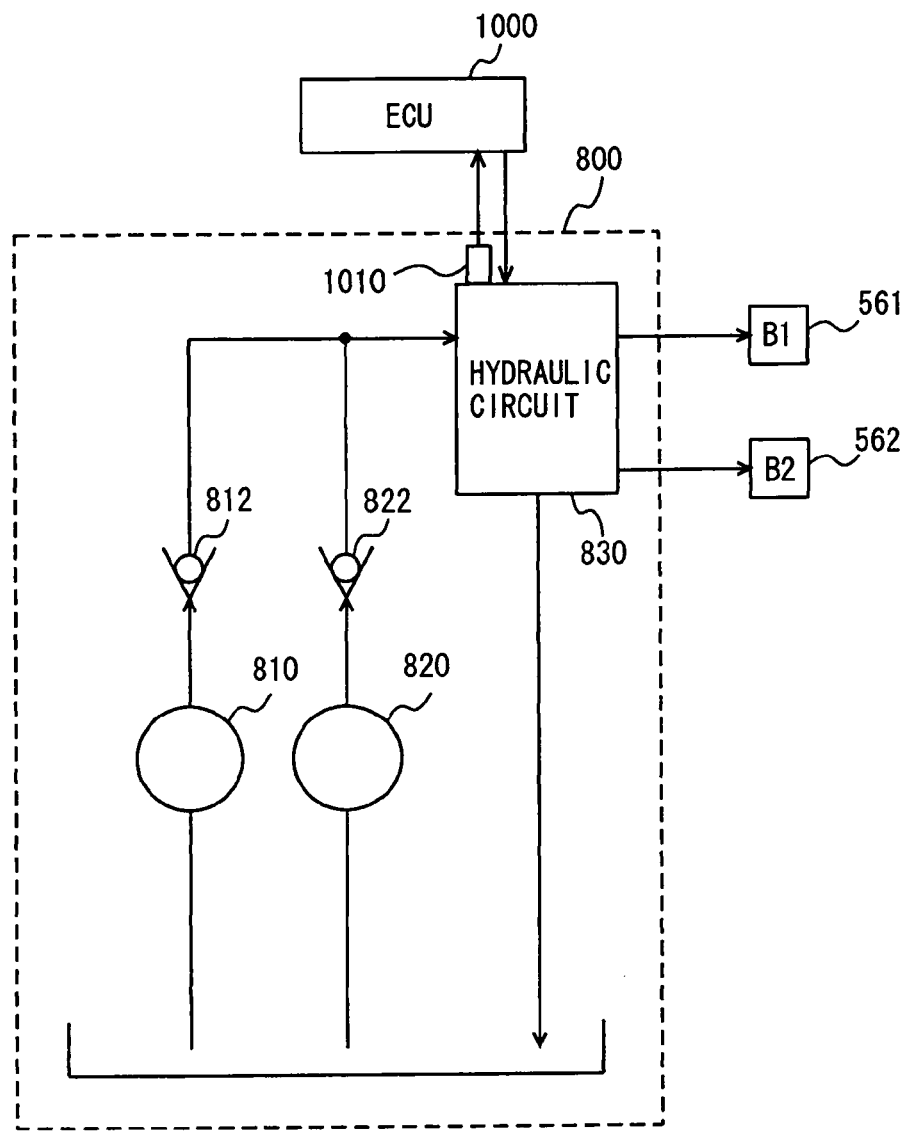
FIG. 4 shows a hydraulic control device of a hybrid vehicle.

FIG. 3 is a nomographic chart of transmission 500. As shown in FIG. 3, when B2 brake 562 fixes ring gear (R) 540, a low gear L is set and a torque output from MG (2) 400 is amplified in accordance with a gear ratio and applied to output shaft 600. In contrast, when B1 brake 561 fixes the first sungear (S1) 510 a high gear H having a gear ratio smaller than low gear L is set. The gear ratio of high gear H is also larger than "1", and a torque output from MG (2) 400 is increased in accordance with that gear ratio and applied to output shaft 600.

Note that when gears L and H are normally set, output shaft 600 receives a torque output from MG (2) 400 that is increased in accordance with a gear ratio, whereas when the gears are being shifted, it receives a torque affected for example by the torque capacity at each brake 561, 562, and an inertia torque of MG (2) 400 that accompanies variation in the number of revolutions per minute of MG (2) 400. Furthermore when MG (2) 400 is in the driving state output shaft 600 receives a positive torque and when MG (2) 400 is in the driven state output shaft 600 receives a negative torque.

This hybrid vehicle is provided with a hydraulic control device 800 feeding and exhausting hydraulic pressure to and from each brake 561, 562 to control each brake to engage and disengage.

Hydraulic control device 800 includes a mechanical oil pump 810 and an electric motor driven oil pump 820, and a hydraulic circuit 830 that adjusts hydraulic pressure generated at oil pump 810, 820 to be a line pressure and also uses the line pressure as an initial pressure to provide an adjusted hydraulic pressure and feed and exhaust the adjusted hydraulic pressure to and from each brake 561, 562, and also supplies an appropriate portion with oil for lubrication.

Mechanical oil pump 810 is a pump driven by engine 100 to generate hydraulic pressure and is for example arranged closer to an output of damper 110 coaxially and adapted to receive torque from engine 100 to operate. In contrast, electric motor driven oil pump 820 is a pump driven by a motor (not shown). It is attached at an appropriate location such as an exterior of a casing (not shown) and adapted to receive electric power from a battery or a similar electricity storage device to operate and generate hydraulic pressure. Electric motor driven oil pump 820 is controlled by ECU 1000 to generate hydraulic pressure as desired. For example, electric motor driven oil pump 820 has a number of revolutions per minute or the like, which is feedback-controlled.

Hydraulic circuit 830 includes a plurality of solenoid valves, switching valves or pressure adjustment valves (all not shown) and is configured to be capable of electrically controlling pressure adjustment, and hydraulic pressure to be fed and exhausted. It is controlled by ECU 1000. Through the hydraulic circuit a hydraulic fluid flows, and its temperature (hereinafter also referred to as "fluid temperature") is detected by a fluid temperature sensor 1010 and a signal representing a result of such detection is transmitted therefrom to ECU 1000.

Note that oil pumps 810 and 820 are provided at their respective discharging sides with check valves 812 and 822, which are opened by pressures respectively caused as oil pumps 810 and 820 discharge, and are closed for a direction opposite to that of the pressures. Oil pumps 810 and 820 are connected to hydraulic circuit 830 in parallel. Furthermore a valve (not shown) that adjusts line pressure is configured to control the line pressure to have two states. More specifically, it increases an amount discharged and thus provides increased line pressure and, in contrast, decreases an amount discharged and thus provides decreased line pressure.

The above described power train includes two power sources, i.e., engine 100 and MG (2) 400, and they are effectively utilized to drive a vehicle sparing on fuel and exhausting a reduced amount of gas. Furthermore, if engine 100 is driven, the number or revolutions of per minute of engine 100 is controlled by MG (1) 200 to achieve optimal fuel economy. Furthermore, in coasting, the vehicle has inertial energy, which is regenerated as electrical power, and when MG (2) 400 is driven to assist torque, and the vehicle has low speed, transmission 500 is set in low gear L to increase a torque applied to output shaft 600, and when the vehicle is increased in speed, transmission 500 is set in high gear H to relatively reduce the number of revolutions per minute of MG (2) 400 to reduce loss to efficiently assist torque.

The above described hybrid vehicle can be run by motive force generated by engine 100, both engine 100 and MG (2) 400, and MG (2) 400 alone, and which of these types of running should be selected is determined as based on accelerator pedal position or a similar drivability required, vehicular speed, and the like. For example if a battery is charged sufficiently and relatively small drivability is required, or quiet start is manually selected or the like, then a type of running that employs MG (2) 400 and is similar to that of an electric vehicle (hereinafter also described as "EV running" or the like for the sake of convenience) is selected, and engine 100 is stopped. If from that condition the accelerator pedal is pressed down or increased drivability is required, or the battery is decreased in availability, or quiet start is manually switched to normal running, then engine 100 is started to switch to a type of running that employs engine 100 (hereinafter also described as "E/G running" or the like).

If such hybrid vehicle has engine 100 in operation an ignition switch 1020 is tuned off by the driver, an engine stopping process is effected to stop engine at a predetermined crank angle for example to reduce a torque required for starting (or cranking) in a subsequent operation.

Figure 5:
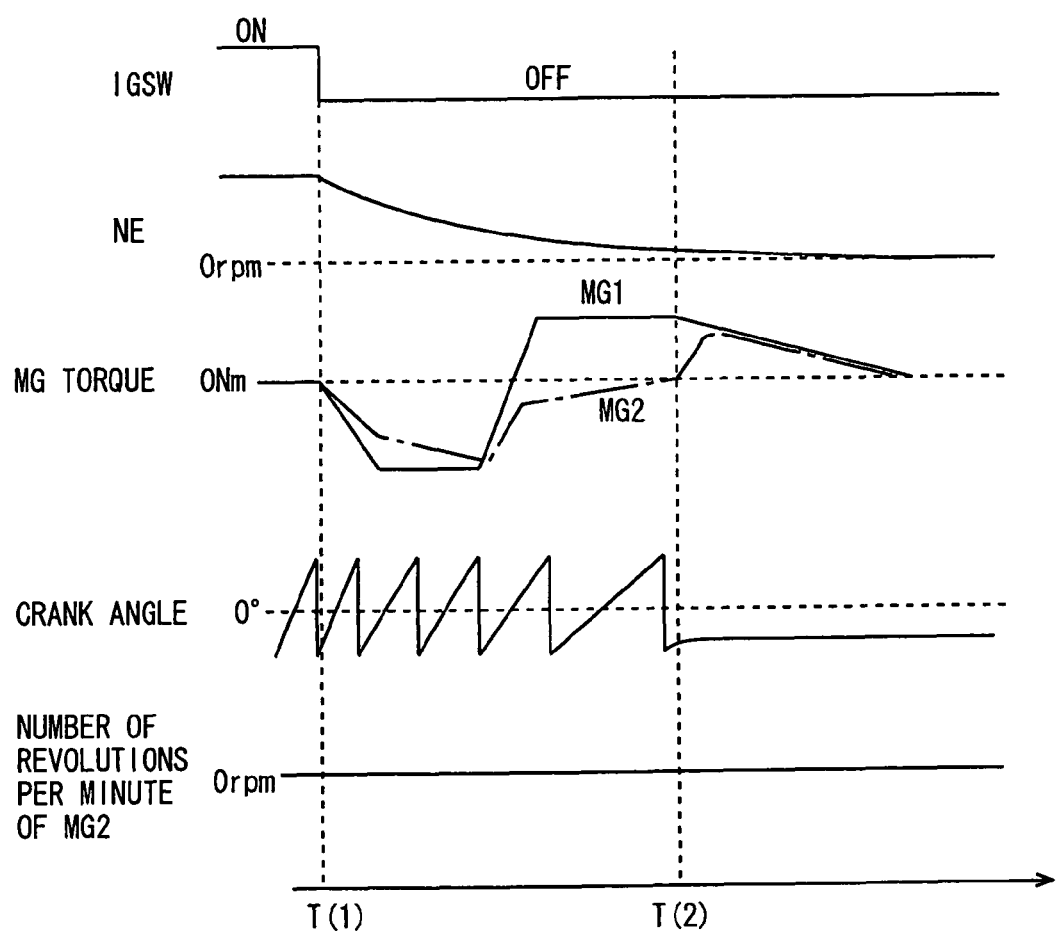
FIG. 5 is timing plots (1) representing how MG (1) and MG (2) transition in an engine stopping process.

In this process, as indicated in FIG. 5 at T(1), when ignition switch 1020 is turned off, MG (1) 200 and MG (2) 400 have their respective torques both decreased and the engine's number of revolutions per minute NE is pulled down.

Subsequently at MG (1) 200 a positive torque is generated and at MG (2) 400 a negative torque is generated. At that time, the torque generated at MG (2) 400, in particular, closes a gap between gears in transmission 500 and thus holds the gears. As such, if engine 100 is stopped and its output shaft (or a crankshaft) varies in how it rotates, the gears in transmission 500 can at least be prevented from violently colliding with each other and accordingly causing noise.

When the engine's number of revolutions per minute NE is a number of revolutions as predetermined per minute and engine 100 attains the predetermined crank angle, MG (1) 200 has its torque, which has been held to be constant, gradually decreased to "0", as indicated in FIG. 5 at T(2). MG (2) 400 has its torque once increased and then gradually decreased to "0". Thus the engine 100 stopping process is performed and engine 100 is stopped at the predetermined crank angle.

If the engine's number of revolutions per minute NE decreases in stopping engine 100, however, mechanical oil pump 810 generates accordingly decreased hydraulic pressure, and if the decreased hydraulic pressure results in B1 brake 561 or B2 brake 562 engaging less firmly, transmission 500 can no longer continue to hold its internal gears with a gap therebetween closed. Accordingly, if engine 100 is stopped and its output shaft varies in how it rotates, transmission 500 can also have an internal gear thereof moved by its backlash and collided against another gear, and thus causing noise.

Accordingly in the present embodiment when engine 100 is stopped electric motor driven oil pump 820 is actuated to ensure hydraulic pressure while the engine 100 stopping process is performed.

Figure 6:
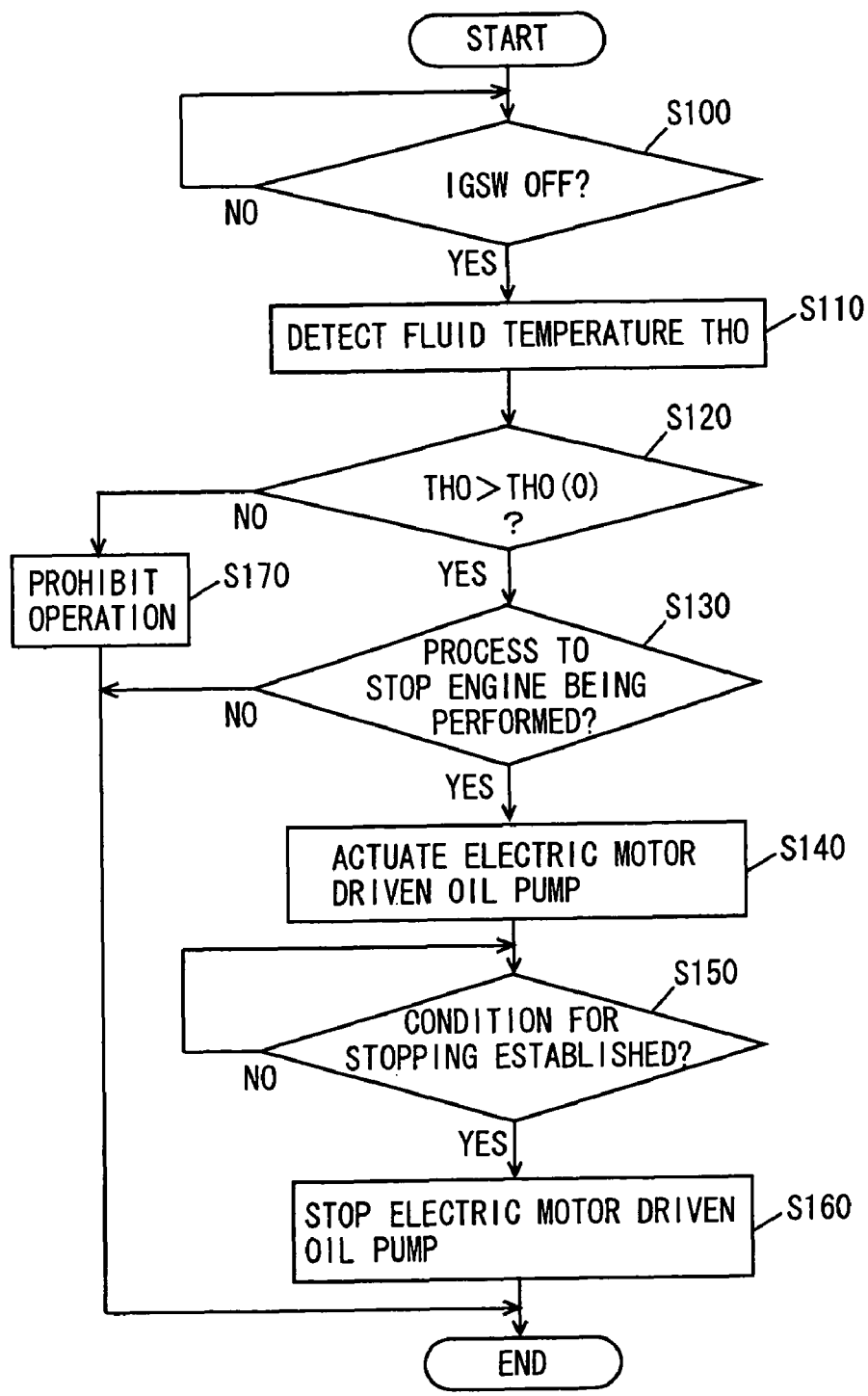
FIG. 6 is a flow chart representing a structure of a program executed by an ECU shown in FIG. 1 for control.

With reference to FIG. 6, the present embodiment provides a control device, or ECU 1000, executing a program having a structure for control, as will be described hereinafter.

At step (S) 100 ECU 1000 determines whether ignition switch 1020 is turned off by the driver while engine 100 in operation. If so (YES at S100) the control proceeds to S110. Otherwise (NO at S100) the control returns to S100.

At S110 ECU 1000 detects a fluid temperature THO (the temperature of the hydraulic fluid) as based on a signal transmitted from fluid temperature sensor 1010.

At S120 ECU 1000 determines whether fluid temperature THO is higher than a threshold value THO (0). If so (YES at S120) the control proceeds to S130 Otherwise (NO at S120) the control proceeds to S170.

At S130 ECU 1000 determines whether the engine 100 stopping process is being performed. If so (YES at S130) the control proceeds to S140. Otherwise (NO at S130) the current process is completed.

At S140 ECU 1000 actuates electric motor driven oil pump 820. At S150 ECU 1000 determines whether a condition for stopping electric motor driven oil pump 820 is established. Note that this condition is that the engine 100 stopping process is performed and the engine's number of revolutions per minute NE is the predetermined number of revolutions per minute, and in that condition when engine 100 attains the predetermined crank angle, then, in response, gradually decreasing the torque of MG (1) 200 that has been held constant is started (as indicated in FIG. 5 at T(2)) and since then a predetermined period of time has elapsed.

This is based on a finding that in the engine 100 stopping process with the engine's number of revolutions per minute NE equal to the predetermined number of revolutions per minute a period of time elapsing before engine 100 attains the predetermined crank angle varies with how engine 100 is operated, whereas a period of time elapsing after gradually decreasing the torque is started (as indicated in FIG. 5 at T(2)) and before the torque attains "0" is substantially constant regardless of how engine 100 is operated.

More specifically, when the engine 100 stopping process is performed with the engine's number of revolutions per minute NE equal to the predetermined number of revolutions per minute and in that condition before engine 100 attains the predetermined crank angle and gradually decreasing the torque of MG (1) 200 held constant is in response started, electric motor driven oil pump 830 can be operated to alleviate or prevent insufficient hydraulic pressure in the engine stopping process.

When such condition for stopping electric motor driven oil pump 820 is established (YES at S150) the control is shifted to S160. Otherwise (NO at S150) the control returns to S150 and with electric motor driven oil pump 820 in operation waits until the condition for stopping the pump is established.

At S160 ECU 1000 stops electric motor driven oil pump 820. At step S170 ECU 1000 prohibits operating (or actuating) electric motor driven oil pump 820. Subsequently the current process ends.

In accordance with the structure and flow chart as described above, the present embodiment provides the control device or ECU 1000 operating as described hereinafter.

When engine 100 is in operation and oil pump and ignition switch 1020 is turned off by the driver (YES at S100), fluid temperature THO is detected as based on a signal transmitted from fluid temperature sensor 1010 (S110).

If fluid temperature THO is lower than threshold THO (0) (NO at S120), the hydraulic fluid is relatively high in viscosity, and in the engine 100 stopping process hydraulic circuit 830 would not have a large amount of the hydraulic fluid leaking therefrom. As such, it is not necessary to actuate electric motor driven oil pump 820 to maintain hydraulic pressure generated at mechanical oil pump 810 before ignition switch 1020 is turned off, and the hydraulic pressure required in the engine 100 stopping process can be maintained (or ensured).

In that case, operating electric motor driven oil pump 820 is prohibited (S170). This can alleviate or prevent unnecessary operation of electric motor driven oil pump 820, and hence alleviate or prevent poor fuel economy.

In contrast, if fuel temperature THO is higher than threshold value THO (0) (YES at S120), then the hydraulic fluid is relatively low in viscosity, and in the engine 100 stopping process hydraulic circuit 830 would not have a large amount of the hydraulic fluid leaking out therefrom. As such, if electric motor driven oil pump 820 is not actuated, the hydraulic pressure required for the engine 100 stopping process cannot be maintained or ensured.

If in that case the engine 100 stopping process is currently performed (YES at S130) electric motor driven oil pump 820 is actuated (S140) This can ensure hydraulic pressure required in the engine 100 stopping process to engage B1 brake 561 or B2 brake 562. Thus while the engine 100 stopping process is performed a torque generated at MG (2) 400 can close a gap between gears in transmission 500 and thus hold the gears. As such, if engine 100 is stopped and its output shaft varies in how it rotates, the gears in transmission 500 can at least be prevented from violently colliding with each other and accordingly causing noise.

Furthermore, the torque generated at MG (2) 400 can reduce variation in the rotation of the output shaft of engine 100 when the output shaft has a number or revolutions per minute passing through the engine's resonance frequency band. This can reduce the vibration that can be caused as engine 100 is stopped.

Figure 7:
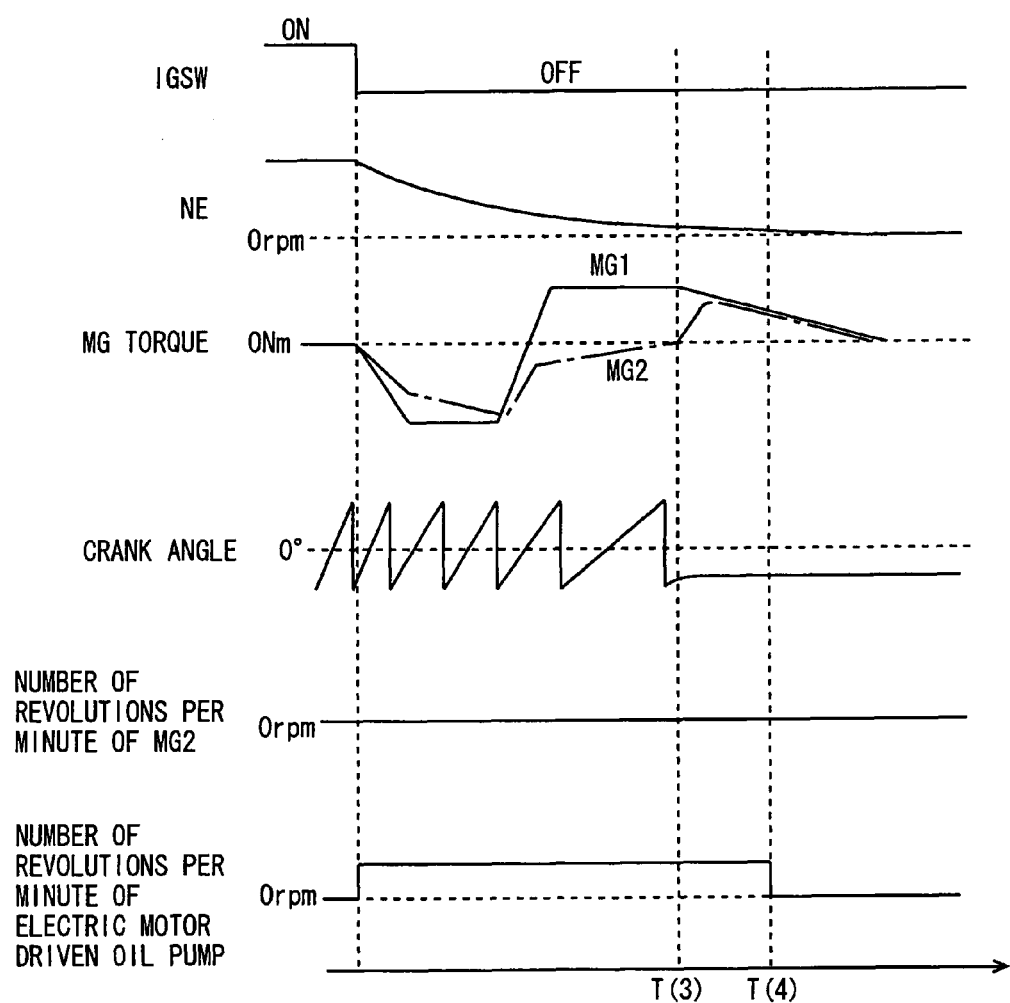
FIG. 7 is timing plots (2) representing how MG (1) and MG (2) transition in an engine stopping process.

Subsequently in the engine 100 stopping process with the engine's number of revolutions per minute NE equal to the predetermined number of revolutions per minute when engine 100 attains the predetermined crank angle and in response, gradually decreasing the torque of MG (1) 200 that has been held constant is started (as indicated in FIG. 7 at T(3)) and since then a predetermined period of time has elapsed, the condition for stopping electric motor driven oil pump 820 is established (YES at S150). Electric motor driven oil pump 820 is thus stopped (S160).

This allows electric motor driven oil pump 830 to be operated for a minimal required period of time. This can prevent electric motor driven oil pump 830 from otherwise operating and accordingly consuming more electrical power, and as a result, alleviate or prevent poor fuel economy.

Thus the present invention provides a control device or an ECU allowing an electric motor driven oil pump to be actuated when a driver turns off an ignition switch to stop an engine. Thus if a mechanical oil pump driven by the engine generates reduced hydraulic pressure the electric motor driven oil pump can ensure hydraulic pressure required to engage the B1 of B2 brake of a transmission. Thus in the transmission a torque generated at MG (2) can close a gap between gears and thus hold the gears, and as a result can alleviate or prevent such noise as otherwise would be caused in the transmission when the engine is stopped as the gears otherwise collide with each other.

Furthermore, the torque generated at MG (2) can reduce variation in the rotation of the output shaft of the engine when the output shaft has a number or revolutions per minute passing through the engine's resonance frequency band. This can reduce the vibration that can be caused when the engine is stopped.

Note that while in the present embodiment electric motor driven oil pump 820 is actuated after ignition switch 1020 is turned off, actuating electric motor driven oil pump 820 may be replaced with increasing a line pressure in hydraulic circuit 830, or the former and the latter may both be performed. This allows hydraulic circuit 830 to have hydraulic pressure therein maintained (ensured) for an increased period of time. This can maintain or ensure hydraulic pressure required to perform the engine 100 stopping process when the process is performed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A vehicular control device for a vehicle having an engine, a first rotating electric machine connected to an output shaft of said engine, a second rotating electric machine, a transmission hydraulically operated to transmit a torque from said second rotating electric machine to a driving wheel, an electric motor driven oil pump, and a mechanical oil pump driven by said engine, the vehicular control device comprising an operation unit, wherein
   if an ignition switch is operated to stop said engine, said operation unit allows said transmission to receive hydraulic pressure to engage a friction engagement element of said transmission and thus control said transmission to be capable of transmitting a torque from said second rotating electric machine;
   if said ignition switch is operated to stop said engine, said operation unit controls said second rotating electric machine to generate a torque; and
   if said engine is in operation and said ignition switch is operated to stop said engine, said operation unit controls said electric motor driven oil pump to be actuated from an OFF state to an ON state.

2. The vehicular control device according to claim 1, wherein if said ignition switch is operated to stop said engine, said operation unit controls said second rotating electric machine to generate the torque while maintaining zero revolutions in said second rotating electric machine.

3. The vehicular control device according to claim 1, wherein;
   said operation unit determines whether hydraulic pressure generated by said mechanical oil pump before that said ignition switch is operated is detected, can be maintained; and
   if said hydraulic pressure generated by said mechanical oil pump can be maintained, said operation unit prohibits activating said electric motor driven oil pump.

4. The vehicular control device according to claim 3, wherein said operation unit determines from temperature of hydraulic fluid whether said hydraulic pressure generated by said mechanical oil pump can be maintained.

5. The vehicular control device according to claim 1, wherein if said ignition switch is operated by a driver to stop said engine, said operation unit controls said first rotating electric machine to generate a torque to rotate said output shaft of said engine to stop said engine at a predetermined crank angle.

6. The vehicular control device according to claim 5, wherein:
   said operation unit controls said first rotating electric machine such that said first rotating electric machine maintains a predetermined torque to allow said engine to have a predetermined number of revolutions for a predetermined period of time, and in that condition, said output shaft of said engine is rotated to attain said predetermined crank angle, and thereafter said torque is reduced to stop said engine at said predetermined crank angle; and
   after said electric motor driven oil pump is actuated from the OFF state to the ON state, said electric motor driven oil pump is stopped as based on a torque of said first rotating electric machine.

7. A method of controlling a vehicle having an engine, a first rotating electric machine connected to an output shaft of said engine, a second rotating electric machine, a transmission hydraulically operated to transmit a torque from said second rotating electric machine to a driving wheel, an electric motor driven oil pump, and a mechanical oil pump driven by said engine, the method comprising the steps of:
   in response to an ignition switch being operated to stop said engine, feeding said transmission with hydraulic pressure to engage a friction engagement element of said transmission to control said transmission to be capable of transmitting a torque from said second rotating electric machine;
   in response to said ignition switch being operated to stop said engine, controlling said second rotating electric machine to generate a torque; and
   if said engine is in operation and said ignition switch is operated to stop said engine, controlling said electric motor driven oil pump to be actuated from an OFF state to an ON state.

8. The method of controlling a vehicle according to claim 7, wherein the controlling of said second electric machine to generate the torque in response to said ignition switch being operated to stop said engine maintains zero revolutions in said second rotating electric machine.

9. The method of controlling a vehicle according to claim 7, further comprising the steps of:
   determining whether hydraulic pressure generated by said mechanical oil pump before that said ignition switch is operated is detected, can be maintained; and
   if said hydraulic pressure generated by said mechanical oil pump can be maintained, then prohibiting actuating said electric motor driven oil pump in the step of controlling said pump.

10. The method of controlling a vehicle according to claim 9, wherein the step of determining whether said hydraulic pressure can be maintained includes the step of determining from temperature of hydraulic fluid whether said hydraulic pressure generated by said mechanical oil pump can be maintained.

11. The method of controlling a vehicle according to claim 7, further comprising the step of controlling said first rotating electric machine to stop said engine at a predetermined crank angle by rotating said output shaft of said engine by causing said first rotating electric machine to generate a torque when said ignition switch is operated by a driver to stop said engine.

12. The method of controlling a vehicle according to claim 11, wherein:
   the step of controlling said first rotating electric machine to stop said engine includes the step of controlling said first rotating electric machine such that said first rotating electric machine maintains a predetermined torque to allow said engine to have a predetermined number of revolutions for a predetermined period of time, and in that condition, said output shaft of said engine is rotated to attain said predetermined crank angle, and thereafter said torque is reduced to stop said engine at said predetermined crank angle; and
   the method further comprises the step of stopping said electric motor driven oil pump, as based on a torque of said first rotating electric machine, after said electric motor driven oil pump is actuated from the OFF state to the ON state.

13. A vehicular control device for a vehicle having an engine, a first rotating electric machine connected to an output shaft of said engine, a second rotating electric machine, a transmission hydraulically operated to transmit a torque from said second rotating electric machine to a driving wheel, an electric motor driven oil pump, and a mechanical oil pump driven by said engine, comprising:

means for feeding said transmission with hydraulic pressure to engage a friction engagement element of said transmission to control said transmission to be capable of transmitting a torque from said second rotating electric machine in response to an ignition switch being operated to stop said engine;

first means for controlling said second rotating electric machine to generate a torque in response to said ignition switch being operated to stop said engine; and second means for controlling said electric motor driven oil pump to be actuated from an OFF state to an ON state in response to said ignition switch being operated with said engine in operation to stop said engine.

14. The vehicular control device according to claim 13, wherein said first means, in response to said ignition switch being operated to stop said engine, controls said second rotating electric machine to generate the torque while maintaining zero revolutions of said second rotating electric machine.

15. The vehicular control device according to claim 13, further comprising:

first means for determining whether hydraulic pressure generated by said mechanical oil pump before that said ignition switch is operated is detected, can be maintained; and means for prohibiting said second means for controlling from actuating said electric motor driven oil pump if said hydraulic pressure generated by said mechanical oil pump can be maintained.

16. The vehicular control device according to claim 15, wherein said first means for determining includes second means for determining, based on a temperature of hydraulic fluid, whether said hydraulic pressure generated by said mechanical oil pump can be maintained.

17. The vehicular control device according to claim 13, further comprising third means for controlling said first rotating electric machine to stop said engine at a predetermined crank angle by rotating said output shaft of said engine by causing said first rotating electric machine to generate a torque when said ignition switch is operated by a driver to stop said engine.

18. The vehicular control device according to claim 17, wherein:

said third means for controlling said first rotating electric machine to stop said engine includes fourth means for controlling said first rotating electric machine such that said first rotating electric machine maintains a predetermined torque to allow said engine to have a predetermined number of revolutions for a predetermined period of time, and in that condition, said output shaft of said engine is rotated to attain said predetermined crank angle, and thereafter said torque is reduced to stop said engine at said predetermined crank angle; and the vehicular control device further comprises means for stopping said electric motor driven oil pump, as based on a torque of said first rotating electric machine, after said electric motor driven oil pump is actuated from the OFF state to the ON state.

* * * * *